United States Patent [19]
Watton

[11] Patent Number: 5,693,117
[45] Date of Patent: Dec. 2, 1997

[54] RADIAL ROTARY FIBERIZER

[75] Inventor: William A. Watton, Pickerington, Ohio

[73] Assignee: Owens-Corning Fiberglas Technology Inc., Summit, Ill.

[21] Appl. No.: 502,247

[22] Filed: Jul. 12, 1995

[51] Int. Cl.⁶ .................................................. C03B 37/04
[52] U.S. Cl. ............................ 65/461; 65/460; 65/465; 65/522; 65/523; 65/524; 264/8; 425/8
[58] Field of Search .................... 65/458, 459, 460, 65/461, 464, 465, 521, 522, 523, 524, 525, 526; 264/8; 425/8

[56] References Cited

U.S. PATENT DOCUMENTS

| | | |
|---|---|---|
| Re. 24,708 | 9/1959 | Heymes et al. . |
| 2,497,369 | 2/1950 | Peyches . |
| 2,582,561 | 1/1952 | Peyches . |
| 3,346,356 | 10/1967 | Anderson et al. . |
| 4,246,017 | 1/1981 | Phillips . |
| 4,497,644 | 2/1985 | Kaveh . |
| 4,601,742 | 7/1986 | Kaveh . |
| 4,670,034 | 6/1987 | Goodridge et al. . |

*Primary Examiner*—Melvin Mayes
*Attorney, Agent, or Firm*—C. Michael Gegenheimer; Curtis B. Brueske

[57] ABSTRACT

A rotary fiberizer includes a spinner for centrifuging fibers from molten material along a path generally coplanar with the spinner, and a pair of opposed annular blowers positioned on opposite sides of the path of the centrifuged fibers, with the blowers having an interior face which is oriented toward the path of the centrifuged fibers, and the blowers having an exterior face which is oriented away from the path of the centrifuged fibers. An induced air conduit associated with each of the blowers is adapted to supply air to the path of centrifuged fibers, and the exterior faces of the blowers contain blower openings to discharge attenuation gasses into the induced air conduits to attenuate the centrifuged fibers.

21 Claims, 3 Drawing Sheets

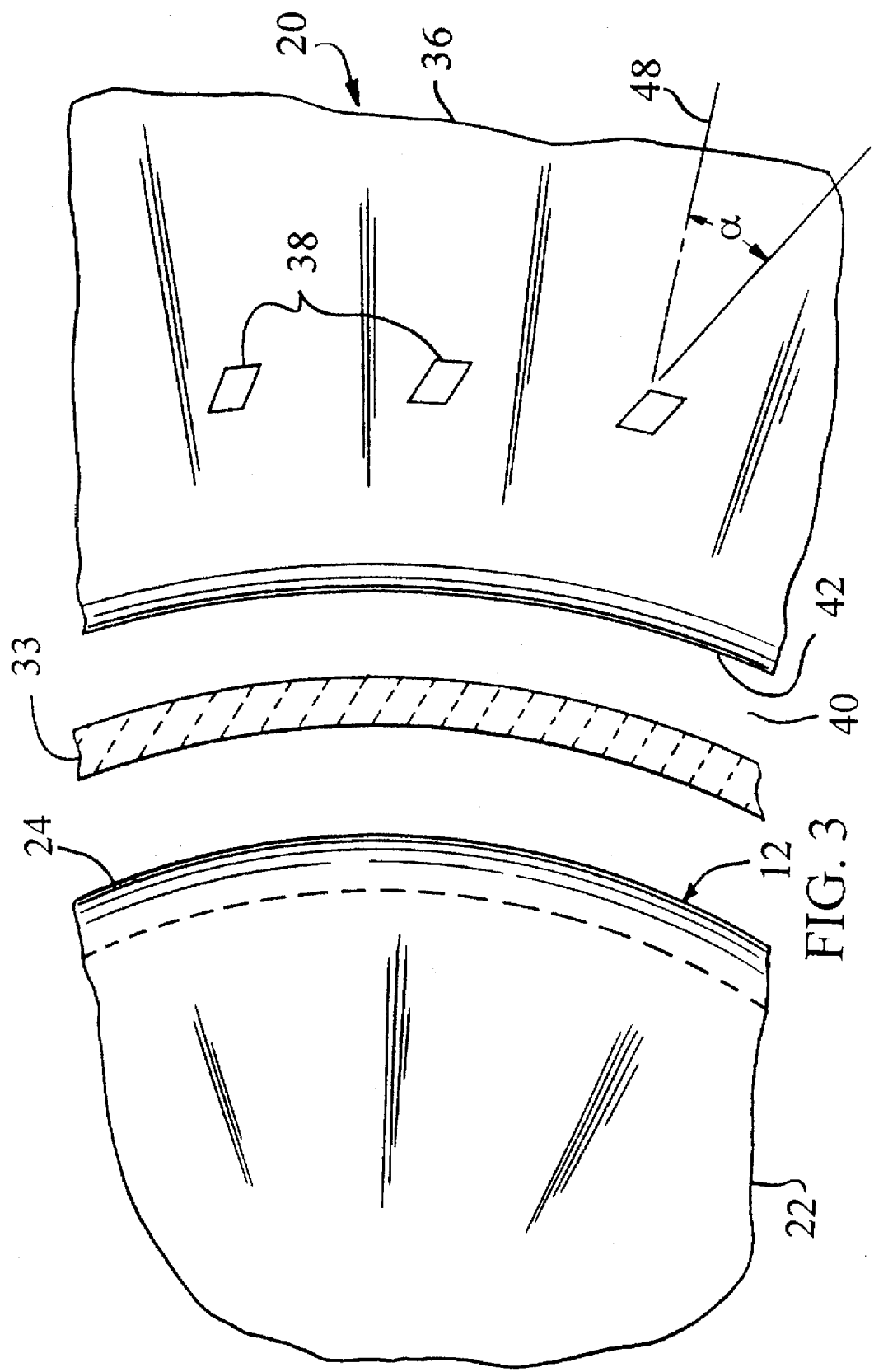

RADIAL ROTARY FIBERIZER

TECHNICAL FIELD

This invention relates to the centrifugation of fibers from molten material using a rotary fiberizer. More particularly, the invention concerns a rotary fiberizer having blowers for discharging attenuation gases to further attenuate fibers discharged from a rotary fiberizer.

BACKGROUND

In the manufacture of fibrous materials it has been found efficient to use a rotary process in which molten material is centrifuged from a rotating spinner. The use of centrifugal force converts the bulk molten material into fibers using relatively small mounts of energy. The spinners used in a rotary process have a peripheral wall containing a multitude of orifices through which the molten material is driven by centrifugal force. Mineral fibers, such a glass fibers, have been manufactured with a rotary process for many years. Recently organic materials, such as polymers, have been made using the rotary process.

Most rotary fiberization processes employ an annular blower to apply an attenuation force to the nascent fibers. The force from the blower acts to pull and further attenuate the fibers into even finer fibers. The blower can discharge relatively cool gases such as air or steam, or can discharge hot gases such as the gases of a combustion burner, as used in the SuperTel process.

Typical blowers are oriented to discharge attenuation gases generally downwardly, to turn the centrifuged fibers in a downward direction, i.e., generally perpendicular to the plane of the spinner. Early versions of the rotary process for glass fibers in the 1950's used a pair of opposed radial blowers which directed attenuation gases radially outwardly to further attenuate the centrifuged fibers into finer fibers. An advance in the use of blowers for rotary fiberizers is to provide a conduit or passageway in the vicinity of the blower to enable air to be induced or drawn in to flow along with the attenuation gases supplied by the blower. The induced air conduits or passageways act to diffuse and spread the attenuation gases so that the attenuation gases act over a wider area to affect a greater number of fibers. Also, the induced air acts to blunt some of the harshness of the attenuation gases from the blower, thereby providing a more uniform force field on the fibers.

Currently used rotary processes have spinners with many thousands of orifices in the spinner peripheral walls to enable high throughput from the fiberizer. One of the problems with high throughput fiberizers is that the fibers contact each other or bump into each other once they leave the spinner peripheral wall. This fiber contact or interference is undesirable because the fibers are still somewhat soft and fiber-to-fiber contact causes surface defects on the fibers. These surface defects degrade the strength of the fibers, and hence diminish the quality of any products made from the fibers. High throughput spinners having many rows of orifices in the spinner peripheral wall are particularly prone to fiber interference.

It would be advantageous to provide a process for fiberization of molten material which could use the inherent efficiency of the rotary process and provide high throughput, while avoiding the fiber degradation problems resulting from fiber interference. Such a process would preferably have attenuation gases which apply attenuation forces to the fibers over a wide area so that the fibers experience more uniform attenuation forces than would otherwise occur.

DISCLOSURE OF INVENTION

There has now been provided an apparatus and a method which enable efficient production of fibers from molten material using a rotary process. A rotary fiberizer includes a spinner and opposed upper and lower blowers which direct the centrifuged fibers radially away from the spinner. By directing the fibers radially outwardly rather than turning the fibers downwardly at a right angle, there will be less fiber-to-fiber contact and hence stronger fibers. The centrifuged fibers travel along a path generally coplanar with the spinner. The opposed annular blowers are positioned on opposite sides of the path of the centrifuged fibers. The blowers have an interior face which faces or is oriented toward the path of the centrifuged fibers, and the blowers have an exterior face which is oriented away from the path of the centrifuged fibers. An induced air conduit is associated with each of the blowers. The induced air conduit is adapted to supply air to the path of the centrifuged fibers. The exterior faces of the blowers contain blower openings to discharge attenuation gasses, preferably into the induced air conduit. The attenuation gases, in conjunction with the induced air, act to attenuate the centrifuged fibers.

In one embodiment of the invention, the blower openings are oriented in a direction toward the spinner, i.e., radially inwardly, and the induced air conduit includes a Coanda surface adapted to change the direction of the attenuation gases and induced air so that they are directed away from the spinner, i.e., radially outwardly. By discharging the attenuation gases in the induced air conduit and in a radially inward direction, and then turning the attenuation gases (and induced air) to a radially outward direction, the attenuation gases will apply attenuation forces to the fibers over a wide area so that the fibers experience more uniform attenuation forces than would otherwise occur.

The blower openings can comprise slots, holes or other similar openings. The blower openings can comprise a plurality of holes. The holes can be oriented in a circumferential direction coinciding with the direction of rotation of the spinner so that the attenuation gases discharged from the holes will have a rotational component with respect to the spinner.

In another specific embodiment of the invention, an opposed pair of annular burners supplies heat to the fibers as they are being centrifuged by the spinner.

According to this invention, there is also provided a method for centrifuging fibers from a rotary fiberizer comprising supplying molten material to a rotating spinner, centrifuging fibers from the molten material to direct the fibers along a path generally coplanar with the spinner, and discharging attenuation gasses from a pair of opposed annular blowers to attenuate the fibers, where the discharging of the attenuation gases is made through blower openings positioned, in the exterior faces of the blowers.

BRIEF DESCRIPTION OF DRAWINGS

FIG. 3 is a schematic plan view showing the apparatus of FIG. 2 along line 3—3 of FIG. 2

BEST MODE FOR CARRYING OUT THE INVENTION

The invention will be described in terms of a glass fiber forming operation. It is to be understood that the invention can be used to manufacture fibers from other mineral material, such as rock, slag and basalt. Also, the invention can be used to manufacture fibers from organic material, both thermoplastic and thermoset, including such polymeric material as polypropylene, polyphenylene sulfide and polyethylene terephthalate.

Figure 1:
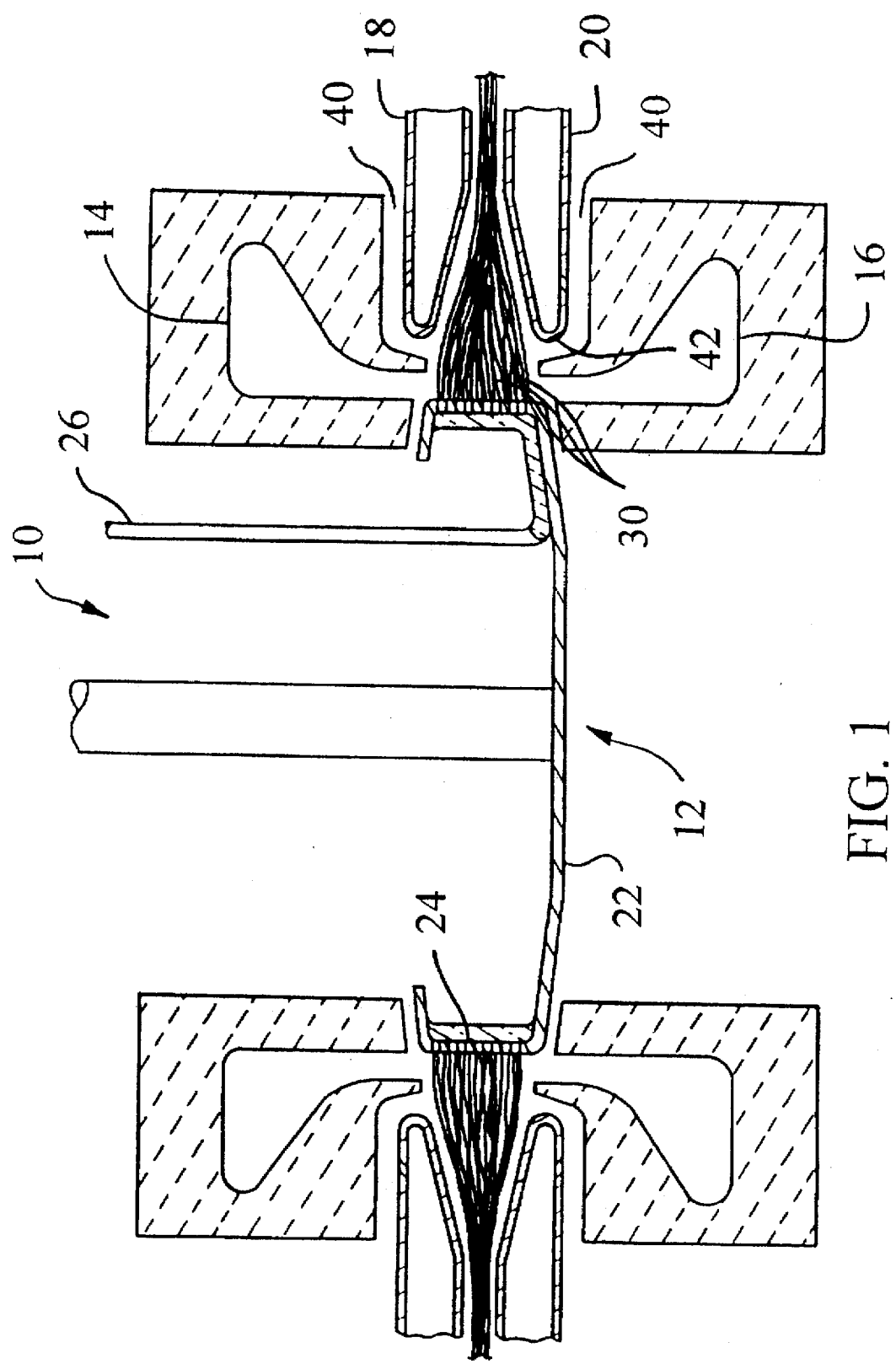
FIG. 1 is a schematic cross-sectional view in elevation of a radial rotary fiberizer of the invention.
Figure 2:
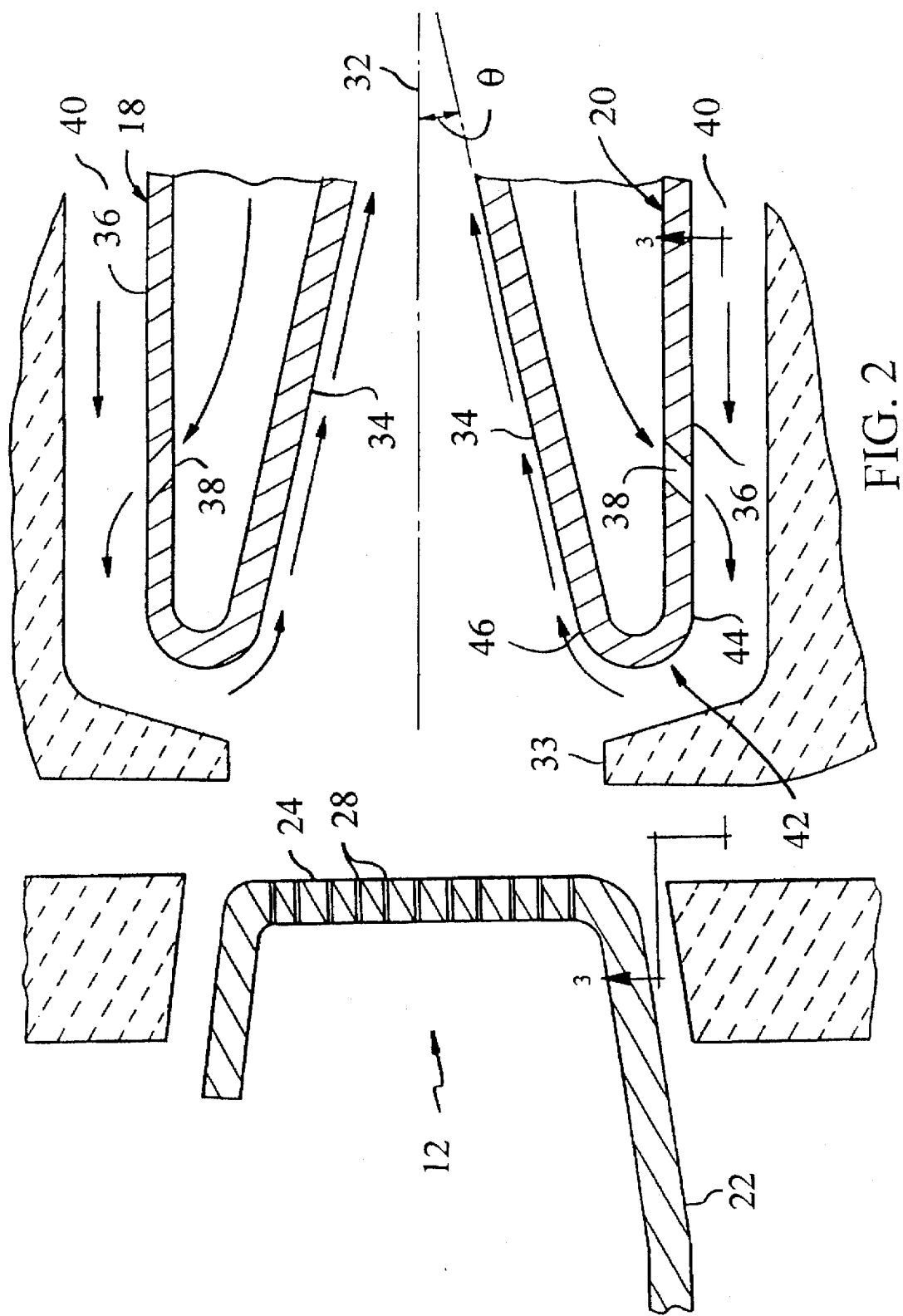
FIG. 2 is a schematic view in elevation showing more detail of the blower of the invention shown in FIG. 1.

As shown in FIGS. 1 and 2, the fiberizer indicated generally at 10 includes a spinner 12, upper and lower opposed burners 14 and 16, respectively, and opposed upper and lower blowers 18 and 20 respectively. The spinner is comprised of a bottom wall 22 and an orificed peripheral wall 24, and can be of any type suitable for centrifuging fibers from molten material. A stream 26 of molten glass is dropped onto the spinner bottom wall 22, and the material flows radially outwardly to the spinner peripheral wall 24. The spinner peripheral wall contains many orifices 28 through which the molten glass is centrifuged to form glass fibers 30. Although the apparatus shown is suitable for making glass fibers from a single glass, the invention can also be used for making bicomponent glass fibers as well as bicomponent organic fibers. The structure and operation of rotary fiberizers as described so far is well known in the art.

The fibers centrifuged from the spinner travel radially outwardly, generally following a path of travel 32 which is coplanar with the spinner. The upper burner 14 and lower burner 16 are optional. They can be employed to supply heat to the spinner peripheral wall and to the emerging glass fibers so that the fibers remain in a soft attenuable condition for further attenuation. The discharge of the burner gases can be directed in any suitable manner, such as by an annular flame ring 33.

Positioned on either side of the path of travel 32 are the annular upper blower 18 and the annular lower blower 20. The blowers have interior faces 34 which are facing or oriented toward the path of travel 32. The blowers also have exterior faces 36 which are oriented away from the path of the centrifuged fibers. The blowers can be made of any suitable material, such as stainless steel and can be supplied with attenuating gases, such as air or steam, from a source, not shown.

The blowers have openings to discharge the attenuating gases. The blower openings can be of say suitable size sad shape to enable the discharge of attenuating gases in the proper volume sad velocity. As shown, the blower openings are slots 38. Other blower openings, such as a continuous slot or a plurality of holes, can also be employed. Preferably the slots have a width within the range of from about 0.2 to about 0.8 mm, and a height within the range of from about 0.4 to about 1.2 mm. The blower slots are preferably arranged circumferentially around the fiberizer on centers of about 1 to 3 mm.

As shown, the blower slots discharge the attenuation gases in passageways which are open to the atmosphere. These passageways, indicated as induced air conduits 40, enable the attenuation gases to induce or pull along a flow of air which helps in the attenuation of the glass fibers. The induced air conduits can be of say shape or size suitable for allowing an airflow to be induced by the jet of the attenuation gases. The blower slots 38 are positioned in the exterior faces 36 of the blowers so that the attenuation gases are discharged into the induced air conduits.

It can be seen from FIGS. 1 and 2 that the blower slots are mounted at an angle to the vertical so that the attenuation gases will be discharged in a direction toward the spinner. In this respect, the slots are oriented in a direction toward the spinner. In order for the attenuation gases and induced air to be effective in radially attenuating the glass fibers, the direction of the attenuation flow must be reversed. This is accomplished by incorporating a Coanda surface 42 on the ends of the blowers in the induced air conduit. The Coanda surface changes the direction of the attenuation gases, preferably by at least 140 degrees, and up to 180 degrees. The commingling of the attenuation gases with the induced air, combined with the reversal of direction by the Coanda surface, will result in a combined attenuation flow which is broader in effective area than would otherwise be the case. This broad effective attenuation area will reduce fiber interference and thereby produce high strength, high quality glass fibers. One way to measure the change of direction in the attenuation flow is to observe the change in direction from the beginning 44 of the curve of the Coanda surface to the end 46 of the curve of the Coanda surface. Preferably, the interior faces of the blower are tapered so that they are slightly converging, preferably at an angle θ within the range of from about 2 to about 30 degrees, and most preferably at an angle θ of about 8 degrees.

As shown in FIG. 3, the blower slots 38 can have an orientation in a circumferential direction so that the attenuation flow of attenuation gases and induced air will be corotating with the fibers as the fibers emanate from the spinner. A preferred angle of blower slot orientation with respect a radius 48 is an angle α which is within the range of from about 10 degrees to about 60 degrees. Most preferably, the blower slot orientation will be about 30 degrees.

It will be evident from the foregoing that various modifications can be made to this invention. Such, however, are considered as being within the scope of the invention.

INDUSTRIAL APPLICABILITY

The invention can be useful in the production of fibers from organic materials, such as polymer materials, as well as the production of mineral fibers such as glass fibers, for such uses as insulation materials and reinforcement materials.

I claim:

1. A method for centrifuging fibers from a rotary fiberizer comprising supplying molten material to a rotating spinner, centrifuging fibers from the molten material to direct the fibers along a path generally coplanar with the spinner, discharging attenuation gasses from a pair of opposed annular blowers to attenuate the fibers, the blowers being positioned on opposite sides of the path of the centrifuged fibers and each having an interior face which is oriented toward the path of the centrifuged fibers and an exterior face which is oriented away from the path of the centrifuged fibers, and supplying air to the path of the centrifuged fibers through an induced air conduit associated with each of the blowers, where the discharging of the attenuation gases is made through blower openings positioned in the exterior faces of the blowers so that the attenuation gasses are discharged into the induced air conduits.

2. The method of claim 1 of comprising discharging the attenuation gases in a circumferential action coinciding with the direction of rotation of the spinner so that the attenuation gases will have a rotational component with respect to the fiberizer.

3. The method of claim 1 in which the molten material is molten mineral material.

4. A rotary fiberizer comprising a spinner for centrifuging fibers from molten material along a path generally coplanar with the spinner, a pair of opposed annular blowers positioned on opposite sides of the path of the centrifuged fibers, the blowers each having an interior face which is oriented toward the path of the centrifuged fibers and an exterior face which is oriented away from the path of the centrifuged fibers, and an induced air conduit associated with each of the blowers, the induced air conduit being adapted to supply air to the path of the centrifuged fibers, where the exterior faces of the blowers contain blower openings oriented in a direction toward the spinner to discharge attenuation gasses to attenuate the centrifuged fibers.

5. The apparatus of claim 4 in which the induced air conduit includes a Coanda surface adapted to change the direction of the attenuation gases and induced air so that they are directed away from the spinner.

6. The apparatus of claim 5 in which the Coanda surface is sufficient to change the direction of the attenuation gases by an amount which is at least 140 degrees up to 180 degrees.

7. The apparatus of claim 4 in which the blower openings comprise slots.

8. The apparatus of claim 4 in which the blower openings comprise a plurality of holes.

9. The apparatus of claim 8 in which the holes are oriented in a circumferential direction coinciding with the direction of rotation of the spinner so that the attenuation gases discharged from the holes will have a rotational component with respect to the fiberizer.

10. A rotary fiberizer comprising a spinner for centrifuging fibers from molten material along a path generally coplanar with the spinner, a pair of opposed annular blowers positioned on opposite sides of the path of the centrifuged fibers, the blowers each having an interior face which is oriented toward the path of the centrifuged fibers and an exterior face which is oriented away from the path of the centrifuged fibers, and an induced air conduit associated with each of the blowers, the induced air conduit being adapted to supply air to the path of the centrifuged fibers, where the blowers include blower openings positioned in the exterior faces of the blowers to discharge attenuation gasses into the induced air conduits to attenuate the centrifuged fibers.

11. The apparatus of claim 10 in which the blower openings are oriented in a direction toward the spinner.

12. A rotary fiberizer comprising a spinner for centrifuging fibers from molten material along a path generally coplanar with the spinner, a pair of opposed annular blowers positioned on opposite sides of the path of the centrifuged fibers, the blowers each having an interior face which is oriented toward the path of the centrifuged fibers and an exterior face which is oriented away from the path of the centrifuged fibers, and an induced air conduit associated with each of the blowers, the induced air conduit being adapted to supply air to the path of the centrifuged fibers, where the blowers contain blower openings positioned in the exterior faces of the blowers to discharge attenuation gasses into the induced air conduits to attenuate the centrifuged fibers, where the blower openings are oriented in a direction toward the spinner, and where the blower openings comprise a plurality of holes.

13. The apparatus of claim 12 in which the induced air conduit includes a Coanda surface adapted to change the direction of the attenuation gases and induced air so that they are directed away from the spinner.

14. The apparatus of claim 13 in which the Coanda surface is sufficient to change the direction of the attenuation gases by an amount which is at least 140 degrees and up to 180 degrees.

15. The apparatus of claim 12 comprising an opposed pair of annular burners which supply heat to the fibers as they are being centrifuged by the spinner.

16. The apparatus of claim 12 in which the holes are oriented in a circumferential direction coinciding with the direction of rotation of the spinner so that the attenuation gases discharged from the holes will have a rotational component with respect to the fiberizer.

17. The apparatus of claim 12 in which the induced air conduit forms a Coanda surface adapted to change the direction of the attenuation gases and induced air so that they are directed away from the spinner, where the Coanda surface is sufficient to change the direction of the attenuation gases by an amount which is at least 140 degrees and up to 180 degrees, and where the holes are oriented in a circumferential direction coinciding with the direction of rotation of the spinner so that the attenuation gases discharged from the holes will have a rotational component with respect to the fiberizer.

18. A rotary fiberizer comprising a spinner for centrifuging fibers from molten material along a path generally coplanar with the spinner, an opposed pair of annular burners which supply heat to the fibers as they are being centrifuged by the spinner, a pair of opposed annular blowers positioned on opposite sides of the path of the centrifuged fibers, the blowers each having an interior face which is oriented toward the path of the centrifuged fibers and an exterior face which is oriented away from the path of the centrifuged fibers, and an induced air conduit associated with each of the blowers, the induced air conduit being adapted to supply air to the path of the centrifuged fibers, where the exterior faces of the blowers contain blower openings oriented in a direction toward the spinner to discharge attenuation gasses to attenuate the centrifuged fibers.

19. The fiberizer of claim 18, wherein the blower openings are positioned in the exterior faces of the blowers so that the attenuation gases are discharged into the induced air conduits.

20. The fiberizer of claim 18, wherein the induced air conduit includes a Coanda surface adapted to change the direction of the attenuation gases and induced air so that they are directed away from the spinner.

21. The fiberizer of claim 18, wherein the Coanda surface is sufficient to change the direction of the attenuation gases by an amount which is at least 140 degrees and up to 180 degrees.

* * * * *